Jan. 11, 1955 K. C. NICHOLSON 2,699,036
CERAMIC LINED, LIGHTWEIGHT ROCKET MOTOR
STRUCTURE AND LIKE DEVICE
Filed Dec. 9, 1950 2 Sheets-Sheet 1

INVENTOR.
KENNETH C. NICHOLSON
BY
ATTORNEY

Jan. 11, 1955

K. C. NICHOLSON 2,699,036

CERAMIC LINED, LIGHTWEIGHT ROCKET MOTOR
STRUCTURE AND LIKE DEVICE

Filed Dec. 9, 1950

INVENTOR.
KENNETH C. NICHOLSON
BY
ATTORNEY

United States Patent Office 2,699,036
Patented Jan. 11, 1955

2,699,036

CERAMIC LINED, LIGHTWEIGHT ROCKET MOTOR STRUCTURE AND LIKE DEVICE

Kenneth C. Nicholson, Niagara Falls, N. Y., assignor to The Carborundum Company, Niagara Falls, N. Y., a corporation of Delaware Application December 9, 1950, Serial No. 200,056

1 Claim. (Cl. 60—35.6)

This invention relates to devices for the combustion and directional release of hot gases, as for example, rocket motor structures designed for the combustion of solid or liquid fuels wherein the fuel is burned in a combustion chamber or zone and the hot gases and other products of combustion released at high velocity through a discharge port or nozzle of restricted cross-section.

The highly corrosive and erosive conditions existing within devices of the above type required materials of high density and very refractory properties. Consequently, such structures have been made almost entirely of dense, heavy, refractory substances especially designed to stand up under severe conditions of use with little or no regard or consideration apparently being given to the overall weight of the device although it is also highly desirable, particularly where such structures are used in aircraft, that the weight of the device be kept to a minimum.

It is an object of the present invention to provide rocket motor structures and comparable devices of improved design and construction which not only possess satisfactory resistance to breakdown under the severe conditions of use to which they are commonly subjected but are also relatively light in weight.

Other objects and advantages accruing from the present invention will become apparent as the description proceeds.

In accordance with the present invention a rocket motor structure or other device for the combustion of solid or liquid fuels and directional release of high velocity hot gases and other products of combustion is provided in which the dense, highly refractory lining material found essential for resistance to the high temperatures and severe corrosive and erosive conditions developed in the combustion chamber does not extend the entire length of the device so as to form any appreciable part of the outwardly flaring walls of the exit or tail cone, but is terminated at a point a short distance beyond the plane of greatest restriction of the discharge nozzle. The body of the exit or tail cone structure is composed of a lighter weight ceramic material which, if desired, can be left unprotected and allowed to form the inner walls of the exit or tail cone. For example, a castable refractory cement of the type used to seat the dense refractory lining of the combustion chamber and nozzle can be used also to form the exit or tail cone body and, if desired, also a rear portion of the nozzle body. As a further modification, particularly where extreme lightness in weight is desired, the ceramic material constituting the exit or tail cone body can be rendered porous by the inclusion of pore-forming substances in the composition. According to a further feature or modification of the present invention the inner walls of the exit or tail cone can be optionally shielded by encasing the exit or tail cone body in a thin inner frusto-conical metal shell composed of stainless steel or other metal capable of resisting corrosion to the required extent. Such a stainless steel or other metal shell however is thin enough that it will not add greatly to the weight of the overall device. The combustion chamber, nozzle, and exit or tail cone structures, regardless of their individual structural features, are confined within an external cylindrical metal shell in which the various parts are seated by means of a layer of refractory cement.

In order that the invention may be more fully understood, reference is made to the drawings which depict specific and illustrative rocket motor structures, and parts thereof, embodying various features of the present invention and in which, Figure 1 is a rear elevational view of a rocket motor structure made in accordance with the teachings of the present invention;

Figure 1:
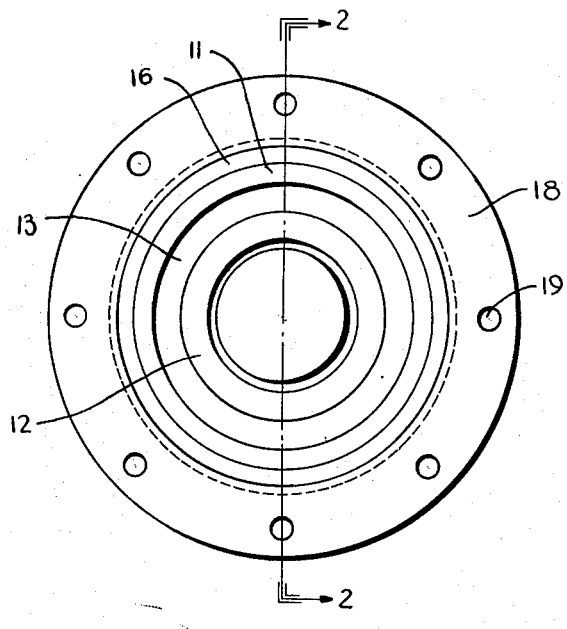
Figure 2:
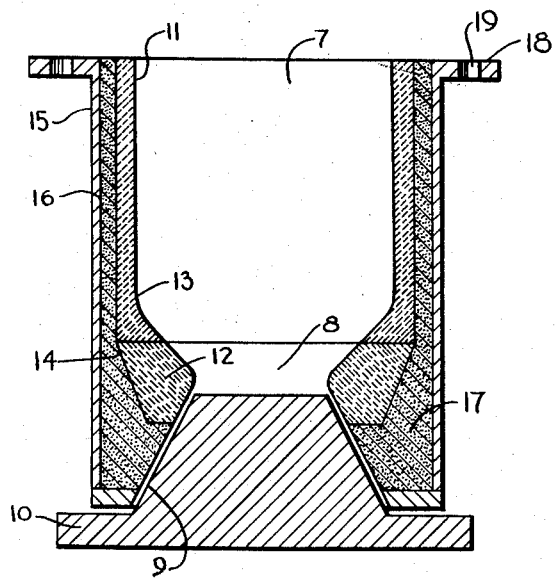
Figure 2 is a cross-sectional view through the line 2—2 of Figure 1.

Referring further to Figures 1 and 2 of the drawing the rocket motor structure shown comprises a combustion zone or chamber 7, a restricted discharge port or opening 8 and an exit or tail cone zone 9, the tail cone zone as shown in Figure 2 being occupied by a temporary frusto-conical shaped molding core 10 which is temporarily used during the formation of the exit or tail cone structure and is later withdrawn. The inner wall or lining 11 of the combustion chamber 7 and the nozzle 12 which forms the discharge opening 8 are constructed of premolded and prefired refractory material which is of sufficient density, hardness and refractoriness to satisfactorily withstand the high temperatures and the extremely corrosive and erosive conditions existing within the combustion zone 7 and discharge zone 8 during the burning of various fuel mixtures and release of resulting hot gases. Another novel feature of the lining structure shown in Figures 1 and 2 is the extension of the lining piece 11 which constitutes the inner cylindrical refractory wall of the combustion chamber a short distance forward so that it also forms a part of the inwardly tapering wall approaching the throat of the nozzle. Heretofore the combustion chamber lining member has terminated and formed a joint with the nozzle lining at a point where the side walls of the combustion chamber start to taper or converge inwardly. This feature of extending the length of the combustion chamber lining piece a short distance forward to form part of the entrance cone of the nozzle presents the fabricating advantage that the nozzle piece 12 is shortened so that its walls at one end are of thicker cross-section and consequently the nozzle can be more facilely formed by pressure molding than is the case when the walls of the nozzle lining piece taper to a relatively thin section at both ends.

The nozzle lining 12 is also premolded and prefired and likewise is composed of a very dense and hard, highly refractory material which will satisfactorily resist the highly erosive conditions set up by the flow of high velocity hot gases through the nozzle. As shown, the nozzle 12 does not extend the entire distance out to the confining metal shell 15 of the rocket motor but the outer face 14 of the nozzle is tapered inwardly in order to reduce the volume of the molded piece 12 and thereby cut down the weight of the nozzle. As stated before, the combustion chamber lining 11 and nozzle 12 are necessarily composed of a relatively dense, heavy material of high refractoriness. One such material which has been found highly satisfactory for such use is that described in my copending patent application Serial No. 68,375, filed December 30, 1948, now Pat. No. 2,636,825. Briefly that material can be described as being composed of granular silicon carbide held together by a bond of boron carbide and boron nitride.

The lining 11 and nozzle 12 are seated in a confining cylindrical metal shell 15 by means of a layer 16 of castable refractory cement, such as a hydraulically setting calcium aluminate cement. The seating cement is also poured around the temporary form or core 10 to form the body of the exit or tail cone 17 which is also confined by the metal shell 15. The confining shell 15 is provided with a mounting flange 18 for mounting to a fuel injector head through bolt holes 19.

A rocket motor structure of the above-described type and as shown in Figures 1 and 2 of the drawing can be made in the following manner. Nozzle 12 is formed by pressing the following mixture, prepared as described below, in a steel mold at 50,000 pounds per square inch pressure in a hydraulic press.

| | Parts by weight |
|---|---|
| 30 grit size silicon carbide grain | 33 |
| 46 grit size silicon carbide grain | 33 |
| 180 grit size silicon carbide grain | 4 |
| 320 grit size boron carbide ($B_4C$) | 30 |

6% by weight of a temporary binder such as a 10% aqueous solution of polyvinyl alcohol, for example, is added to the above mixture and the material well mixed to form a pressure-moldable mass. Although a water solution of polyvinyl alcohol is specified as the temporary binder in the above mixture any of those materials commonly used for temporary binders in ceramic mixes, such as dextrin, concentrated waste cellulose sulfite liquors and powders, various resins, waxes and the like, can be used.

The molded nozzle is dried at 225–250° F. and then placed in a graphite lined chamber of a high frequency electric furnace with the nozzle standing on a pedestal of graphite. An inlet tube made of graphite is used to pass nitrogen gas into the furnace chamber. A graphite plate, used to cover the top of the furnace, is provided with a hole in the center which serves as a vent for the gases created during the burning operation and also permits temperature readings to be taken of the furnace interior by means of an optical pyrometer. The furnace is heated to an approximate temperature of 700° C. and held at that temperature until the temporary binder is burned off. A nitrogenous atmosphere is provided in the furnace chamber by introducing a stream of commercial grade dry nitrogen gas from a tank under pressure through the graphite inlet tube. Having established an atmosphere of nitrogen within the furnace the furnace is rapidly heated until a temperature of 2250–2275° C. is reached. The temperature is then held at 2250–2275° C. for 30 minutes after which the electric power is shut off and the furnace allowed to cool while maintaining a flow of nitrogen into the furnace.

A chemical analysis of a nozzle made in accordance with the above example shows the following composition for the fired nozzle:

| | Per cent |
|---|---|
| Silicon | 44.96 |
| Carbon | 26.33 |
| Boron | 18.66 |
| Nitrogen | 9.94 |
| | 99.89 |

Assuming that all the silicon is combined with carbon as silicon carbide and that all the nitrogen is present as boron nitride, BN, the following is the calculated composition of the fired nozzle:

| | Per cent |
|---|---|
| Silicon carbide, SiC | 64.2 |
| Boron nitride, BN | 17.6 |
| Boron carbide, $B_4C$ | 14.03 |
| Uncombined carbon | 4.04 |
| | 99.87 |

It is known that silicon nitride decomposes at around 1900° C. and, since the nozzle was heated to 2250–2275° C. it appears likely that the nitrogen which is taken up enters the composition by reason of reaction with a portion of the boron carbide, the nitrogen replacing carbon under these conditions to form boron nitride.

The combustion chamber lining 11 can be similarly made although it has usually been found desirable to form the combustion chamber lining by an edge tamping procedure because of the greater length and relatively thin wall thickness of the molded piece which renders the machine molding of such shapes rather difficult. However, it is not desired to restrict the methods of making the combustion chamber lining or nozzle to the specific techniques described above since those pieces can be made of the above compositions by any conventional molding or forming procedure such as by machine pressing, hand or machine tamping, jolting, slip-casting and air hammer tamping.

The combustion chamber lining and nozzle can be made of other suitable refractory compositions, preferably in premolded and prefired condition in order to obtain the maximum density and refractoriness desirable for resistance to the high temperatures and corrosive conditions of use customarily encountered in rocket motor operation. For example, another material which has been found satisfactory for such uses is that described in my copending patent application Serial No. 83,767, filed March 26, 1949, now Pat. No. 2,637,091. That material can be briefly described as consisting of a body of granular silicon carbide bonded by an interstitial carbide bond of boron and zirconium carbides or boron carbide, silicon carbide and zirconium carbide. Other lining compositions which have been used with satisfaction include variously bonded carbide bodies, boride bodies, nitride bodies, refractory oxide bodies and the like.

Having molded and fired the combustion chamber liner 11 and nozzle 12, the nozzle and chamber liner are preferably cemented together with a refractory cement so they may be handled as one unit. The rocket motor structure is then assembled by placing the cylindrical steel shell 15 upon core piece 10 and positioning the nozzle 12 and combustion chamber lining 11 upon the cone of insert 10, as shown in Figure 2. The intervening space between the outer metal shell 15 and the insert 10, nozzle 12 and combustion chamber lining 11 are then filled with a castable refractory cement 16. One castable refractory cement which has been found satisfactory for such use is a calcium aluminate cement such as that sold by the Universal Atlas Cement Company of 100 Park Avenue, New York 17, New York under the trade mark name of "Lumnite" cement. A typical analysis of an hydraulically setting calcium aluminate cement is alumina 45%, lime 35%, iron oxide 15% and silica 5%. Other suitable compositions for use as the refractory cement which is used to seat the combustion chamber lining and nozzle and form the body of the tail cone include aluminum oxide-sodium silicate compositions and zirconia-sodium silicate compositions. The refractory cement 16 not only serves to seat the combustion chamber lining and nozzle but also fills the space between the temporary insert 10 and the outer metal shell 15 to form the body 17 of the exit or tail cone of the rocket motor. After the refractory cement has been poured and allowed to harden or set, which usually takes about 24 hours, the insert 10 is removed and the entire structure oven-dried at 200–250° F. overnight. The rocket motor is then ready for use. The outer cylindrical confining shell is provided with a suitable flange 18 with bolt holes 19 for bolting it or otherwise attaching it to an injector head through suitable vents of which the fuel is injected into the combustion chamber.

Figure 3:
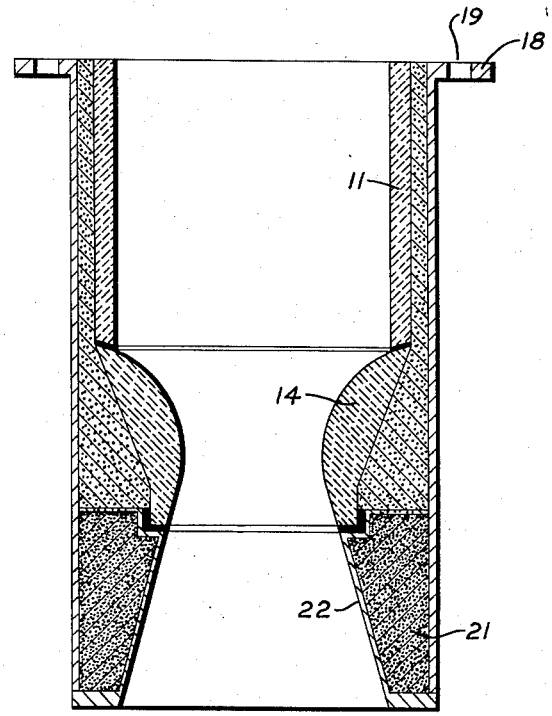
Figure 3 is a cross-sectional view similar to that of Figure 2 showing a modification of the present invention in which the exit or tail cone body is shielded by an inner metal shell.

Figure 3, in which like parts are identified by similar reference numerals, shows a modified form of rocket motor structure in which the refractory body of the nozzle is still further reduced in volume with a consequent reduction in overall weight of the device since the space to the rear of the dense refractory nozzle piece which is filled with the lighter weight ceramic cement constitutes a greater volume than the volume occupied by the dense refractory body portion of the nozzle. The weight of the rocket motor structure is still further reduced by the added feature of having the refractory cement 21 forming the body of the exit or tail cone composed of a foamed refractory cement obtained by adding pore-forming materials to refractory cement compositions such as those above-described in connection with the construction shown in Figures 1 and 2. For example, a "Lumnite" cement produces a foamed or porous structure when set by adding foam stabilizing materials to the castable mixture immediately prior to pouring the cement into the space to be filled. Such foamed refractory cements provide the additional feature of still greater lightness in weight. However, since they are of lesser refractoriness it is found desirable to shield the cone body, particularly when such foamed compositions are used, by encasing them in an inner metal lining member 22 which then forms the inner surface of the cone body.

This cone is welded to the outer cylindrical steel shell 15 at its extreme outer end 22.

Figure 4:
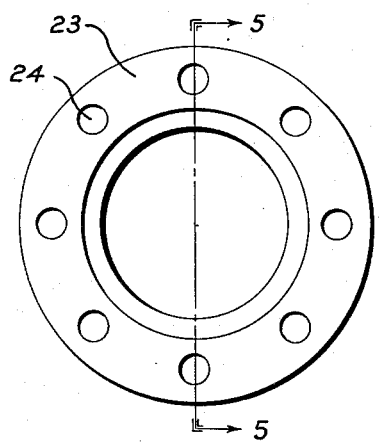
Figure 4 is a top plan view of a stainless steel tail cone lining or shell of the type used in constructing the rocket motor structure of Figure 3.
Figure 5:
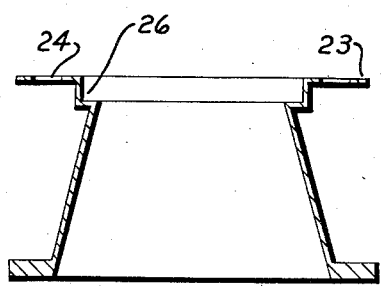
Figure 5 is a cross-sectional view through the line 5—5 of Figure 4.

Figures 4 and 5 show the steel exit cone member 22 in greater detail, particularly showing the manner in which the upper wall 23 of the cone member is provided with a plurality of openings 24 about its perimeter through which the refractory cement composition 21 can be poured to form the main body of the exit cone. The top of the metal cone is provided with an inset or shoulder 26 upon which is seated the nozzle 14.

I have taken advantage of the fact that there are lower temperatures and less erosive conditions prevailing at the exit or tail cone section of rocket motor structures and that these less severe conditions do not require the high density, hard refractory materials which are necessary within the combustion chamber and at the nozzle throat. As a result, rocket motor structures and other similar devices constructed in accordance with the present invention have the novel advantage of providing for the first time a light weight structure without sacrificing any appreciable resistance to high temperatures and corrosive conditions normally involved in the use of such mechanisms. This has been accomplished as a result of a study and investigation separately of each section of the rocket motor structure and the conditions which it is expected to meet and applying to the construction of that section materials best suited for the purpose and combining those materials and parts to form a complete mechanism of lighter weight without sacrifice of performance value. It is also noted that the present device offers the further marked advantage of using a simple cylindrical metal confining shell which is far less expensive than the specially contoured metal shells other structures would require. Moreover, the described device is easily constructed and the cost is reduced as compared to the cost involved in prior art structures requiring confining shells of special shapes and wherein the entire ceramic lining of the device including the exit cone has been constructed of the same dense heavy refractory material which is usually much more expensive than the seating cement.

Having described the invention in detail it is desired to claim:

A device for the combustion and directional release of hot gases comprising a combustion chamber having the walls thereof composed of a dense, hard, prefired ceramic refractory body, a discharge nozzle of restricted cross-section adjoining the combustion chamber, the walls of said nozzle being composed of a dense, hard, prefired ceramic refractory body, and an exit cone adjoining the discharge nozzle, said exit cone walls being composed of a light-weight ceramic material, the aforesaid combustion chamber, nozzle and exit cone being encased in axial alignment in an outer cylindrical metal shell and seated therein by means of a layer of refractory cement.

References Cited in the file of this patent

UNITED STATES PATENTS

| | | |
|---|---|---|
| 1,611,353 | Lepinte | Dec. 21, 1926 |
| 1,798,934 | Forse | Mar. 31, 1931 |

FOREIGN PATENTS

| | | |
|---|---|---|
| 502,560 | France | Feb. 24, 1920 |
| 578,007 | Great Britain | June 12, 1946 |